United States Patent [19]

Souders et al.

[11] Patent Number: 5,591,289
[45] Date of Patent: Jan. 7, 1997

[54] METHOD OF MAKING A FIBROUS HEADLINER BY COMPRESSION MOLDING

[75] Inventors: Steven L. Souders, Portsmouth; Colin Frost, Dover, both of N.H.

[73] Assignee: Davidson Textron Inc., Dover, N.H.

[21] Appl. No.: 496,314

[22] Filed: Jun. 29, 1995

[51] Int. Cl.⁶ .................................... B32B 31/04
[52] U.S. Cl. .............. 156/148; 156/245; 156/307.3; 156/307.7; 156/308.2; 156/324.4; 264/37; 264/258
[58] Field of Search .................. 156/148, 245, 156/308.2, 324.4, 307.3, 307.7; 264/37, 257, 258, 134, 319; 181/290; 296/211; 428/300, 235

[56] References Cited

U.S. PATENT DOCUMENTS

| | | | |
|---|---|---|---|
| 3,451,885 | 6/1969 | Klein | 156/148 |
| 4,172,918 | 10/1979 | Doerer | 428/174 |
| 4,330,584 | 5/1982 | Doerer | 428/91 |
| 4,352,522 | 10/1982 | Miller | 296/214 |
| 4,610,478 | 9/1986 | Tervol | 296/214 |
| 4,840,832 | 6/1989 | Weinle et al. | 428/156 |
| 4,851,283 | 7/1989 | Holtrop et al. | 428/284 |
| 5,068,001 | 11/1991 | Haussling | 156/222 |
| 5,082,716 | 1/1992 | Satterfield et al. | 428/175 |
| 5,106,679 | 4/1992 | Wataya et al. | 428/285 |
| 5,217,799 | 6/1993 | Sumii et al. | 428/300 |
| 5,258,585 | 11/1993 | Juriga | 181/286 |
| 5,275,865 | 1/1994 | Nicolay | 428/174 |
| 5,286,557 | 2/1994 | Jacob et al. | 428/288 |
| 5,286,929 | 2/1994 | Kazama et al. | 181/286 |
| 5,436,046 | 7/1995 | Sakamoto | 156/148 |

*Primary Examiner*—Michael W. Ball
*Assistant Examiner*—Richard Crispino
*Attorney, Agent, or Firm*—Reising, Ethington, Barnard & Perry

[57] ABSTRACT

A fibrous headliner for a motor vehicle passenger compartment is formed with a nonwoven high loft batting of thermoplastic fibers having a low percentage of binder fibers that are activated with heat to establish and hold the desired appearance side contour of the headliner. The batting is needled on both sides to form integral fibrous skin layers wherein the roof side layer is substantially thicker and more dense than the passenger compartment side skin layer. The high density skin layer is then coated with a thermoset resin after the batting has been heated to activate the binder fibers. The hot batting with its resinated high density skin layer is then sandwiched by a blank of scrim stock on this side and a blank of adhesive coated cover stock on the appearance side. This assembly is then placed in a heated form mold wherein the mold surfaces are heated to different temperatures to facilitate the curing of the thermoset resin and bonding of the scrim thereto, and setting of the cover at the passenger compartment side skin layer. The resin coated fibrous skin layer with the scrim bonded thereto forms a strong, elastic frame at the back side of the headliner from which the fibers are suspended to absorb the sounds transmitted through the cover and adjoining low density fibrous layer.

7 Claims, 3 Drawing Sheets

1

METHOD OF MAKING A FIBROUS HEADLINER BY COMPRESSION MOLDING

TECHNICAL FIELD

This invention relates to headliners for motor vehicle passenger compartments and more particularly to those employing a fibrous material for sound absorption.

BACKGROUND OF THE INVENTION

The headliner used in motor vehicle passenger compartments is a multi-purpose component in that it serves to present an aesthetically pleasing finished appearance to the ceiling of the passenger compartment and also provides both sound absorption and heat insulation. In recent years, a large amount of emphasis has been placed on the acoustic properties of the headliner because of customer requirements for a quiet environment. And various headliner constructions have been proposed that seek to provide better sound deadening properties while meeting the other demanding requirements of a headliner.

There are primarily two basic types of headliner constructions that are used in the automotive industry; namely, the foam core type and the fibrous core type. The foam core type is the most widely used and typically comprises a normally flexible sound absorbing polyurethane foam core sandwiched between two fiberglass reinforcement layers and surfaced with a thin flexible foam cushioning layer, and a fabric surface layer or cover. In a lesser used version of this type, a rigid foam core is utilized. In the fibrous type headliner, a batting of glass fibers is impregnated with a thermoset resin. The resin impregnated batting is compression molded to the desired contour, and the resin is cured to bond the fibers together to maintain the molded shape. A thin layer of foam, such as polyurethane, normally overlies the molded fiberglass batting, and a fabric cover is attached to the foam for visual appearance. Another fiber type is one formed of polyethylene terephthalate (PET) fibers impregnated with thermoplastic and surrounded on opposite sides with glass fiber reinforcements which are held in place with a thermoset binder. Both the foam core and fibrous core type headliners provide good acoustical insulation with the fibrous type possessing an acoustical advantage but they are also very brittle and as a result are easily fractured or broken during shipment from their site of manufacture to the vehicle assembly plant. Furthermore, they are also subject to breakage or damage such as permanent creasing where they have to be bent or flexed to a significant degree during their installation. As a result, they typically must be installed through a large opening such as the windshield or rear window opening prior to installation of the glass and are not readily replaced at a later date.

An important feature of the above type fiberglass headliners does lie in their self-support but with the accompanying disadvantage of limited elasticity and the problem of the glass fibers irritating assembly plant workers. As a result, a great deal of effort has been directed toward producing a relatively highly elastic, self-supporting type headliner of lightweight construction and particularly one with the acoustical advantage of fibrous sound absorbing material. Many different fibrous type headliner constructions have been proposed that seek to improve the structure thereof in various respects including the above objectives but they typically do not take maximum advantage of the superior acoustical benefits available from the use of the fibrous material and/or add to the complexity of the panel construction. Examples of such proposals are found in the following U.S. Pat. Nos. 4,172,918; 4,330,584; 4,352,522; 4,160,478; 4,480,832; 4,828,910; 4,851,283; 5,068,001; 5,082,716; 5,106,679; 5,258,585; 5,275,865; 5,286,557 and 5,286,929. The above U.S. Pat. No. 4,840,832 is an example of where the panel construction has not been complicated to a great degree with the use of a thermoplastic batting and there is provided a high degree of elasticity but the strength is limited by relying on the integral bonding of the thermoplastic fibers at their random crossing points to provide the main supporting framework structure of the headliner.

SUMMARY OF THE INVENTION

The present invention offers a very simple, cost effective solution to the problem of providing a very strong, yet highly elastic, lightweight fibrous headliner, both in the method of its making and the headliner produced by this method. In accordance with the present invention, there is utilized a nonwoven high loft batting of thermoplastic fibers having a low percentage of binder fibers that are activated with heat at a certain temperature to establish and hold the front side (passenger compartment side) contour of the headliner. The batting is needled on both sides to different depths and degrees to form integral skin layers of fibers therein wherein the layer on the roof side is significantly thicker and more dense than the skin layer on the passenger compartment side and is spaced a substantial distance therefrom. In the formation of the headliner, only the denser roof side skin layer of fibers on a blank of the thus needled batting stock is coated with a thermoset resin after the batting blank has been heated to activate the binder fibers. The hot batting blank is then sandwiched by a blank of scrim stock at its integral roof side resinated fibrous skin layer and by a blank of adhesive coated cover stock at its integral but much thinner and less denser fibrous skin layer on its passenger compartment side and this assembly is then placed in a heated form mold to form the desired contour of the headliner wherein the high loft is compressed slightly during molding to form the appearance surface. The form mold surfaces are heated to different temperatures to facilitate the curing of the thermoset resin on the roof side fibrous skin layer and bonding of the scrim which requires a relatively high temperature and the setting of the cover on the passenger compartment side fibrous skin layer which requires a relatively low temperature and wherein the high loft batting is only slightly compressed to form the appearance side contour at the cover side. When the laminated assembly has obtained sufficient physical properties in the press mold to maintain the shaped contour, it is then removed and cooled and finally trimmed to form a finished headliner with the desired outline.

In the compression molding operation, the integral resin coated fibrous skin layer of denser fibers bonds with the scrim and forms a strong, highly flexible and resilient or elastic structure, which may best be described as a "backbone" or "frame" at the back side of the headliner from which the fibers are suspended and extend to the cover side. The backbone while providing self-support in the headliner, also has a high degree of flexibility coupled with resilience or elasticity to allow a large amount of forced bending of the headliner without damage or breakage to safeguard it in handling and to easily facilitate its entry into the vehicle interior and installation on the ceiling of the passenger compartment. For example, the headliner of the present invention may be readily bent without damage or breakage into a loop shape for entry into the passenger compartment through a side window or door opening rather than requiring use of the wider windshield or rear window opening in the vehicle body prior to installation of the glass. Another significant feature resides in the ability to readily tune the headliner to a particular passenger compartment installation in the construction phase by simply varying the fiber content and/or the denier of the high loft batting and/or the weight of the fiber portion.

It is therefore an object of the present invention to provide a new and improved fibrous headliner for motor vehicle passenger compartments and a method of making the same.

Another object is to provide a strong, lightweight, self-supporting, elastic, fibrous headliner for a motor vehicle passenger compartment and a method of making the same.

Another object is to provide a fibrous headliner for a motor vehicle passenger compartment wherein a nonwoven batting of polymeric thermoplastic fibers including a small percentage of binder fibers is used to form the essential supporting structure of the headliner by forming the fibers on one side of the batting into a very dense integral fibrous skin layer and coating just this layer with a thermoset resin and bonding same to a scrim layer in a compression molding operation.

Another object is to provide a strong, lightweight, self-supporting, flexible, fibrous headliner for a motor vehicle passenger compartment wherein the fibers of a nonwoven high loft polymeric thermoplastic fiber batting that includes a small percentage of binder fibers are formed into a very dense fibrous skin layer on one side of the batting and this skin layer is coated with a thermoset resin following heat activation of the binder fibers and bonded to a scrim layer to form a suspension structure that supports the fibers and the shape of the headliner.

Another object is to provide a fibrous headliner for a motor vehicle passenger compartment having a strong flexible self-supporting structure with suspended sound deadening fibers formed from a nonwoven high loft batting of polymeric thermoplastic fibers with a small percentage of binder fibers wherein the batting is needled to form a relatively thick, high density, back side and a relatively thin, low density, front side and the supporting structure is formed by coating just the back side layer of fibers with a thermoset resin after the nonwoven batting has been heated to activate the binder fibers and then heat curing the resinated fiber layer and bonding same to a scrim layer to form a strong backbone supporting the fibers in the batting for sound absorption while adhesively attaching a cover to the front side layer and setting the binder fibers therein to form and maintain the appearance side contour of the headliner in a compression molding operation.

These and other objects, advantages and features of the present invention will become more apparent from the following description and accompanying drawings wherein:

DETAILED DESCRIPTION OF THE DRAWINGS

Figure 1:
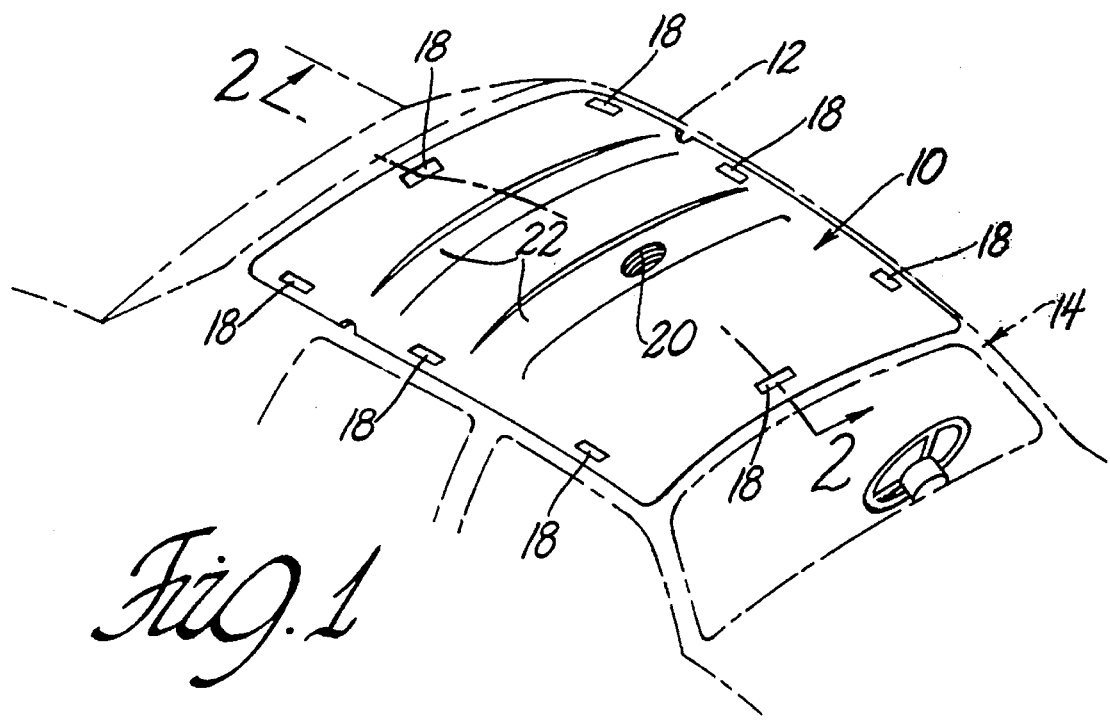
FIG. 1 is a perspective view from above of a headliner constructed in accordance with the present invention and wherein phantom lines are used to illustrate the environmental setting of the headliner as installed in the passenger compartment of a motor vehicle.
Figure 2:
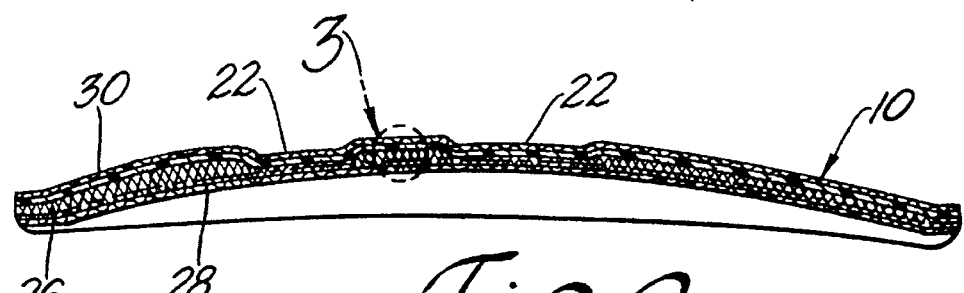
FIG. 2 is a view taken along the line 2—2 in FIG. 1 when looking in the direction of the arrows.
Figure 3:
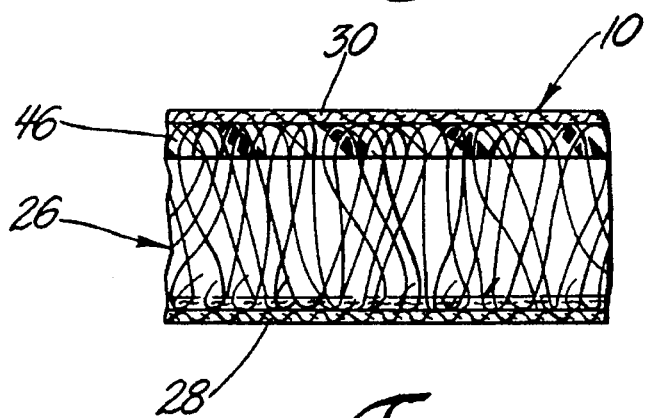
FIG. 3 is an enlarged partial view of FIG. 2.

Referring to FIGS. 1–3, there is illustrated a headliner 10 constructed according to the present invention installed on the underside of the metal roof 12 in the passenger compartment of a motor vehicle 14. The headliner 10 is attached to the underside of the roof by fastener strips 18 of the hook and loop type such as Velcro and by interior trim strips (not shown) and forms an aesthetically pleasing finished surface to the ceiling of the passenger compartment. The headliner typically has a cut-out opening 20 for a dome light and other various openings (not shown) as necessary for accommodating other components such as the mounting hardware for sun visors and grab handles depending on the vehicle body style. The headliner also typically has accommodating recessed areas or channels 22 in its roof or back side that accommodate transversely extending structural reinforcing ribs (not shown) of the metal roof. The recessed areas 22 are formed in the headliner during the press molding operation by compressing the material of the headliner to a greater degree in these areas so that they are of reduced thickness relative to other areas of the headliner.

The headliner 10 comprises a fibrous core 26 with a cover 28 on its front or passenger side providing an aesthetically pleasing ceiling surface and a scrim 30 on its back or roof side providing reinforcement and aid in the release of the headliner from the press mold.

The fibrous core 26 is formed from a nonwoven high loft batting of polymeric thermoplastic fibers having a small percentage of low melting temperature binder fibers that have been formed into a web that is then needled to different degrees on the opposite sides thereof as an important feature of the present invention. The nonwoven batting has a fiber density of about 16–30 ounces per square yard, the fibers have a length of about 2 inches and the high loft of the batting ranges from a minimum of about 15 mm to a maximum of about 30 mm. The denier of the fibers is in the range of about 5–30 to obtain superior sound absorbing properties and is preferably an even blend (about 1:1) of 6 and 15 denier.

The polymeric fibers which comprise the batting are formed of a thermoplastic polymer. Examples thereof include homopolymers and copolymers of nylon, polyester, polyethylene, polyolefin, polypropylene and blends of fibers formed from these polymers and copolymers. The binder fibers are utilized to adhesively bond the fibers in the batting together and comprise about 5–30% by weight of the total batting weight. The binder fibers may, for example, be a low melt polyester or a polyolefin or a bi-component fiber. To minimize costs, recycled high melt fibers may be used to make up the major portion of the batting and low melt polyolefin fibers used as the binder fibers. Examples of bi-component or composite fibers that may be used are co-extruded polyethylene terephthalate (PET) fibers and polyester core/polypropylene sheath fibers.

Figure 4:
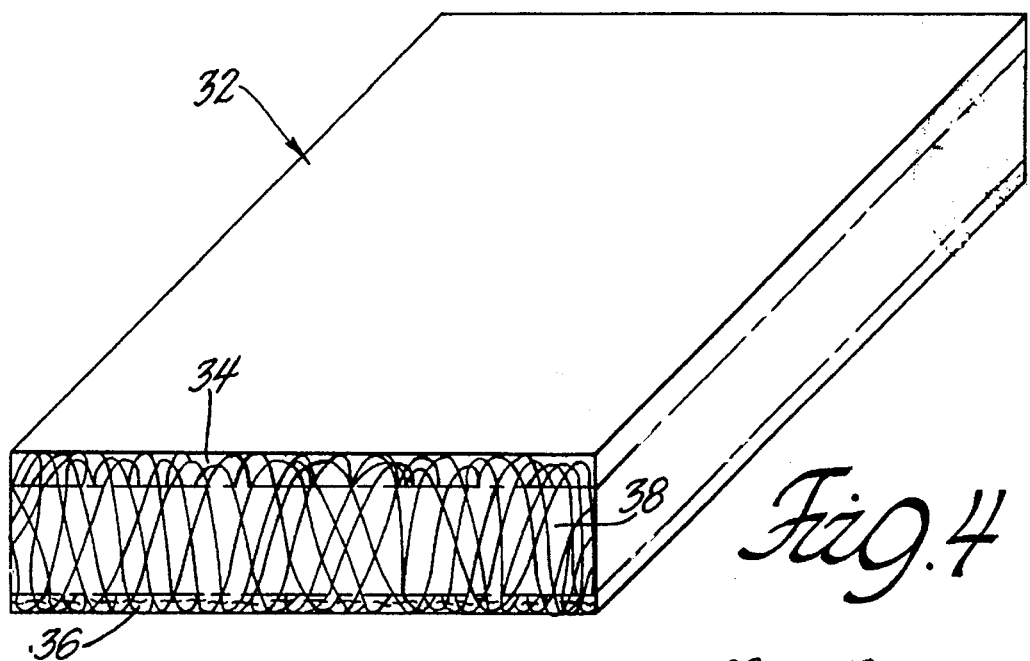
FIG. 4 is a perspective view of the batting of polymeric fibers used in the formation of the headliner in FIG. 1.

The orientation of the fibers comprising the nonwoven high loft batting coupled with use of the above binder fibers and a coating of thermoset resin to just the back side of the batting at the extremities of the fibers on this side to bond these fibers together and to the scrim is very important to the incorporation of high strength into the fibrous core itself while minimizing weight and very effectively utilizing the sound absorbing properties of the fibers in the resulting headliner. According to the present invention, the web of nonwoven high loft batting having binder fibers as described above is needled on both sides but to different degrees and used to form batting stock for the formation of the headliner. A blank of this stock used to form the core 26 of the headliner is shown FIG. 4 and is designated as 32 and will be referred to in describing the details of the high loft batting fiber processing according to the present invention. The side of the batting used to form the roof side of the headliner is highly needled with barbed needles having very aggressive barbs and to a relatively deep degree to form an integral skin layer 34 of highly entangled, very dense fibers at this side as illustrated in FIG. 4. The other side of the batting used to form the appearance side of the headliner is needled with a lesser concentration of needles with less aggressive barbs and to a relatively shallow degree to form a much thinner, less tangled, less dense, integral skin layer 36 of fibers as compared to the skin layer 34. The above needling can be readily done with conventional well known batting needling machines and needles and preferably with a dual acting needler machine that needles both sides of the batting stock simultaneously for fast production. Following needling, there is left a relatively thick intermediate integral fiber layer 38 between the needled layers 34 and 36 wherein the fibers remain in their normal (nonwoven and un-needled) state and this intermediate layer has a thickness substantially greater than the combined thickness of the two outer needled layers.

Figure 7:
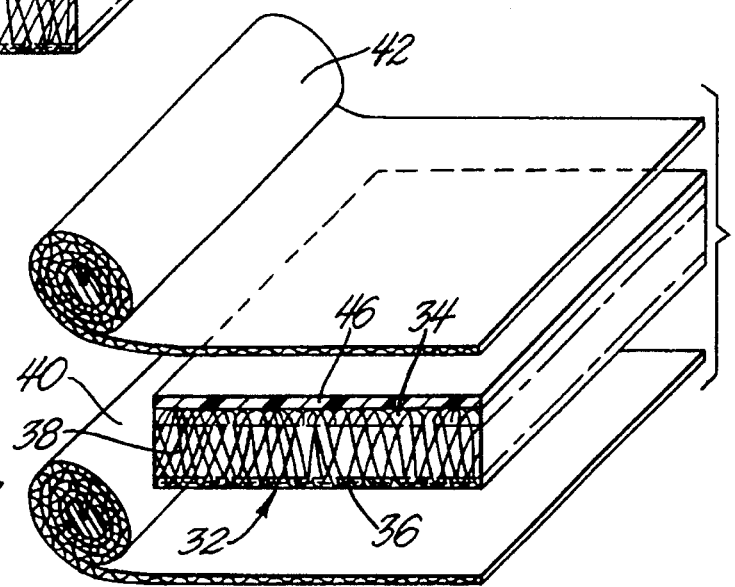

Describing now the other materials of the headliner, the cover 28 is for appearance purposes and made of a suitable material to complement the vehicle interior. The cover material may for example be a foam backed knitted cloth having a color that matches or complements the interior colors of a particular vehicle model. Typical of such cloth material is knitted nylon tricot with 3–6 mm of polyether urethane foam that is flame laminated to the back side of the cloth. Other examples of suitable cover materials are nonwoven carpeting and knitted polyester tricot material. The cover material is coated with a heat activated adhesive on its back side such as polyester powder or a polyamide web adhesive may be used to bond the cover material. A roll of such cover stock material is shown in FIG. 7 and designated as 40. The scrim 30 is a relatively lightweight material such as polyester, rayon, and nylon and blends thereof. A roll of such scrim stock material is also shown in FIG. 7 and is designated as 42. The scrim is used as an aid in releasing the headliner from the forming die and also to bond with and add strength to the headliner at the fibrous skin layer 34 on curing of the thermoset resin applied to the latter.

Figure 5:
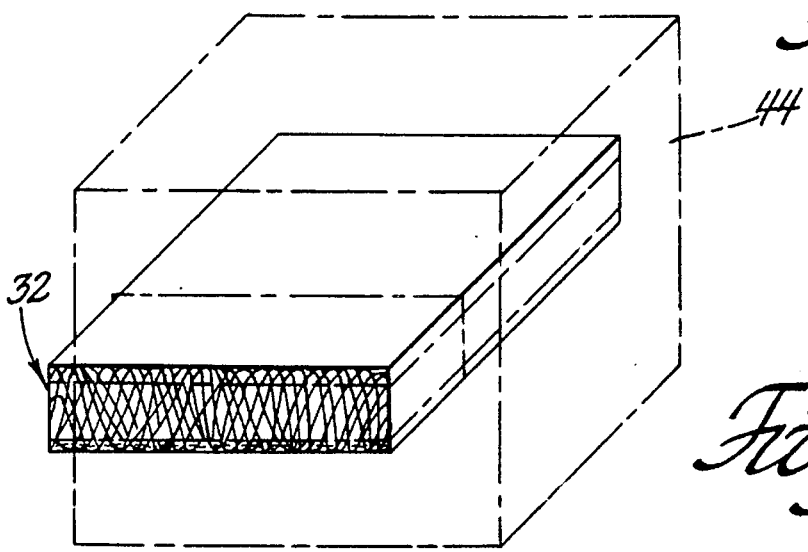
FIGS. 5–8 are schematic views illustrating the process used to form the headliner in FIG. 1.
Figure 6:
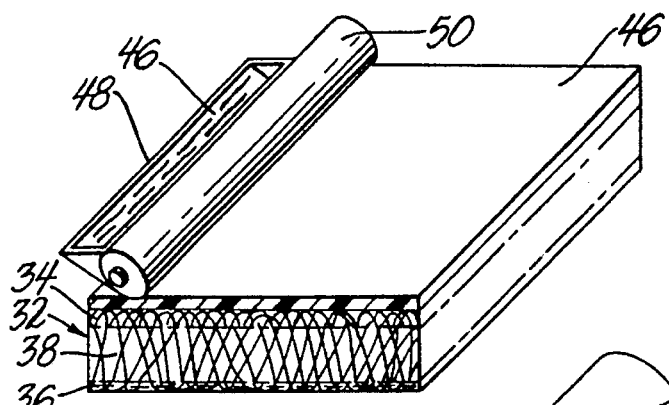

Describing now the molding of the headliner, the headliner batting blank 32 is passed through an oven 44 as shown in FIG. 5 which is heated to a temperature of about 400°–450° F. to activate the binder fibers which typically have an activating temperature of about 350° F. Then as shown in FIG. 6, a thermoset resin 46 is applied from a feeder trough 48 with an applicator roller 50 to the more highly needled resinated fiber skin layer 34 to coat just the highly entangled high density fibers in this layer. Examples of suitable thermoset resins are polyurethane, polyurea, phenolformaldehyde and combinations of phenol and urea formaldehyde.

Figure 9:
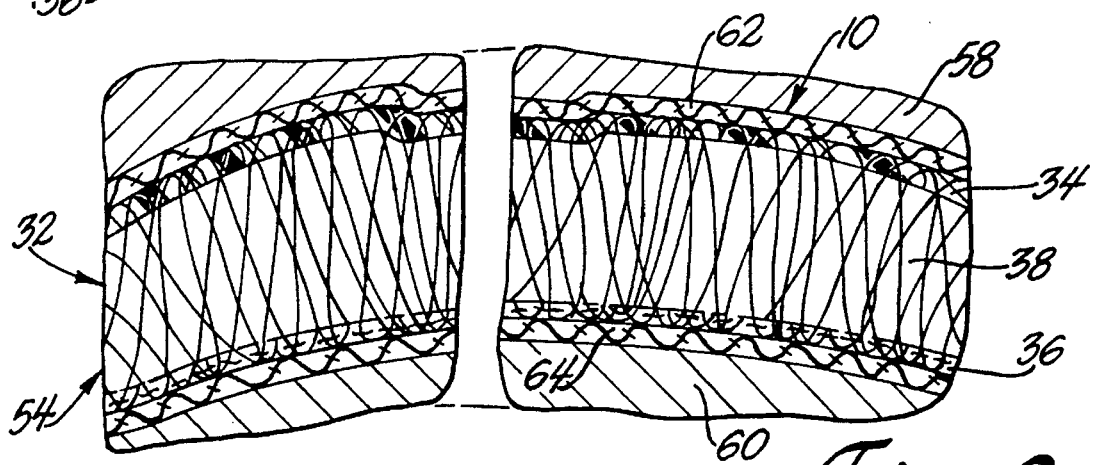
FIG. 9 is an enlarged partial view of FIG. 8.
Figure 8:
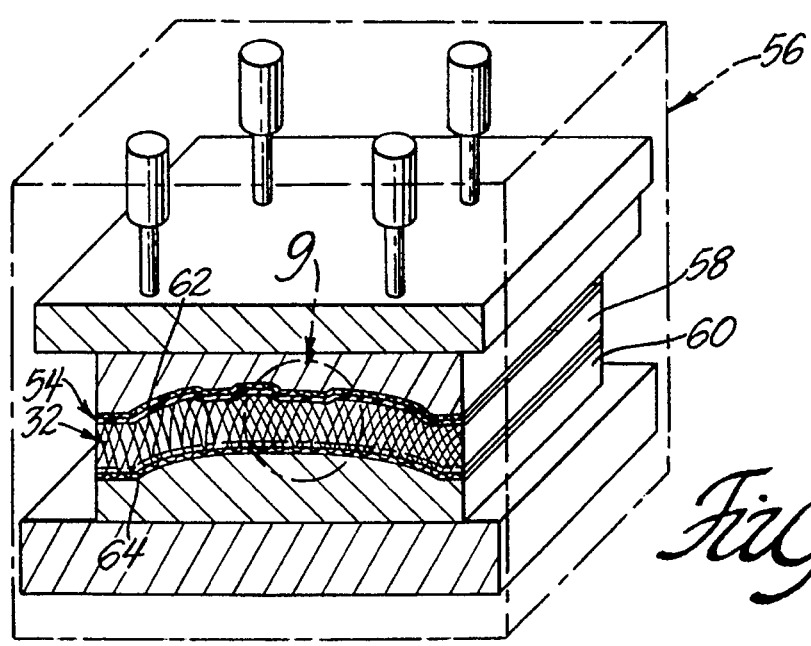

Following the thermoset resin coating of the fiber skin layer 34, the scrim stock 42 and cover stock 40 is applied to the back side and front side of the batting blank respectively as illustrated in FIG. 7. The scrim stock and cover stock are then cut to the size of the batting blank to form a three-layer headliner forming assembly 54 that is positioned in a press mold 56 as shown in FIG. 8 and molded together with heat and pressure in a compression molding operation on closure of the mold. The press mold has upper and lower contour dies 58 and 60 having die surface contours shaped to those contours desired in the finished headliner and the dies are pressed against the opposite sides of the layered assembly on closure of the mold as shown in FIGS. 8 and 9. The die surfaces are heated to different temperatures to facilitate the curing of the thermoset resin coating 46 on the back side fibrous skin layer 34 and bonding of the scrim blank 62 to these resin coated fibers, but just adhesively bonding the cover blank 64 to the non-resin coated batting fibers in the layer 36 whose heat activated, less dense and less tangled, binder fibers are then being conformed and set to hold the desired shape of the appearance side of the headliner with the cover adhered thereto. In the press molding of the headliner, the high loft of the batting can be compressed from about 1 inch to about ⅛ inch the relatively small high compression areas but is compressed only about 10% in the higher loft areas of the headliner so that the vast majority of the fibers remain effective along most their length after needling and molding for good sound absorption between these layers in the finished headliner. Typical temperatures for this compression molding operation are about 350°–400° F. at the surface of the upper die 58 for the back or scrim side and about 250°–300° F. at the surface of the lower die 60 for the appearance or cover side.

When the laminated assembly has acquired sufficient self-supporting strength, it is removed from the press mold and placed in a fixture (not shown) that acts as a cooling fixture and a trim nest. The press molded laminated assembly is trimmed to the desired outline of the headliner and preferably with a waterjet of a conventional type wherein the cooling cycle is typically no longer than the trimming time.

In the resulting headliner structure, the thermoset fibrous skin layer 34 with the scrim 30 bonded thereto provides a very lightweight and rigid but still highly flexible and resilient backbone or frame from which the batting fibers are suspended and act very efficiently to absorb sounds transmitted through the relatively remote cover 28 and thin, non-thermoset, fibrous layer 36 which mainly serves to hold the appearance side of the headliner. Furthermore, the acoustics of the headliner may be readily tuned to a particular passenger compartment installation or interior vehicle body design in the headliner manufacturing process by simply altering the fiber content and/or the denier of the batting 32 wherein an increase in active fiber density by either means provides greater sound absorption.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of making a motor vehicle passenger compartment headliner comprising the steps of:

providing a nonwoven batting of polymeric thermoplastic fibers having a minor percentage of low melting temperature binder fibers and a high loft that exceeds at least about 15 mm, needling opposite sides of said batting to form an integral fibrous first skin layer of relatively high fiber density and substantial fiber entanglement on one of the sides and an integral fibrous second skin layer of relatively low fiber density and less fiber entanglement as compared to the first layer on the other side and wherein said integral fibrous skin layers are resultantly spaced a substantial distance apart by an integral fibrous intermediate layer of un-needled nonwoven fibers, heating said batting to activate said binder fibers, coating said first skin layer with a thermoset resin, laying a scrim against said resinated first skin layer, laying a cover with a heat activated adhesive against said second skin layer, heating and pressing together said batting, said thermoset resin, said scrim and said cover in a compression molding operation to conform said scrim and said first skin layer to a desired back side contour and to facilitate curing of said thermoset resin and bonding of said scrim to said first skin layer to form a laminated assembly, wherein said heating comprising heating the first layer, the thermoset resin and the scrim to one temperature to form a headliner backbone of substantial flexibility and resilience for supporting the shape of the headliner while heating said second skin layer and the cover to a lower temperature to conform said cover and said second skin layer to a desired appearance side contour with slight compression of the intermediate layer;

cooling and trimming said laminated assembly to form said headliner.

2. A method as defined in claim 1 wherein said first skin layer is formed with a thickness substantially greater than that of said second skin layer.

3. A method as defined in claim 1 wherein said intermediate layer of nonwoven and un-needled fibers is formed with a thickness substantially greater than the combined thickness of said skin layers.

4. A method as defined in claim 1 wherein said batting is formed with polymeric thermoplastic fibers comprised of mainly recycled fibers and said binder fibers are polyolefin fibers.

5. A method as defined in claim 1 wherein said batting is formed so that said binder fibers comprise about 5–30% by weight of the total batting weight.

6. A method as defined in claim 1 wherein said batting is formed with an original thickness of about 15–30 mm and fibers having a denier of about 5–30 and a length of about 2 inches.

7. A method as defined in claim 1 wherein said batting is formed with an original thickness of about 15–30 mm, a weight of about 16–25 ounces per square yard, and fibers having a length of about 2 inches.

* * * * *